United States Patent
Johnson et al.

(10) Patent No.: US 9,163,156 B2
(45) Date of Patent: Oct. 20, 2015

(54) BUTYL RUBBER CONVERSION TO DISPERSION AND BUTYL RUBBER DIPPED GLOVE

(75) Inventors: Michael Johnson, Mount Pleasant, SC (US); James W. Brown, Hanahan, SC (US); William Eleazer, York, SC (US); Charles Brown, North Charleston, SC (US)

(73) Assignee: Honeywell International Inc., Morristown, NJ (US)

(*) Notice: Subject to any disclaimer, the term of this patent is extended or adjusted under 35 U.S.C. 154(b) by 199 days.

(21) Appl. No.: 13/352,168

(22) Filed: Jan. 17, 2012

(65) Prior Publication Data

US 2013/0181367 A1    Jul. 18, 2013

(51) Int. Cl.
*C09D 123/22* (2006.01)
*A41D 19/00* (2006.01)

(52) U.S. Cl.
CPC .......... *C09D 123/22* (2013.01); *A41D 19/0058* (2013.01); *C08L 2201/54* (2013.01)

(58) Field of Classification Search
CPC ..................................... C09D 123/22
USPC .......................................... 264/129
See application file for complete search history.

(56) References Cited

U.S. PATENT DOCUMENTS

| | | |
|---|---|---|
| 2,120,406 A | 6/1938 | Hansen |
| 2,311,488 A | 2/1943 | Thomas |
| 2,359,698 A | 10/1944 | Uhlig |
| 2,944,038 A | 7/1959 | Hunter |
| 3,689,613 A | 9/1972 | Talalay |
| 3,983,062 A | 9/1976 | Baldwin et al. |
| 3,998,772 A | 12/1976 | Beerbower et al. |
| 4,007,149 A | 2/1977 | Burton et al. |
| 4,077,933 A | 3/1978 | Burton et al. |
| 4,190,685 A | 2/1980 | Hart et al. |
| 6,759,473 B1 | 7/2004 | Nakamura et al. |
| 6,764,731 B2 | 7/2004 | Savoca et al. |
| 6,920,643 B2 | 7/2005 | McGlothlin |
| 2009/0234064 A1* | 9/2009 | Wang et al. ............ 524/552 |
| 2011/0178234 A1 | 7/2011 | Wang et al. |

* cited by examiner

*Primary Examiner* — Larry Thrower
(74) *Attorney, Agent, or Firm* — Wood, Phillips, Katz, Clark & Mortimer

(57) ABSTRACT

Butyl rubber based coating agents for preparing a coated article, such as a glove, wherein a butyl rubber solution is in the form of a dispersion, and methods of using butyl rubber based coating agents.

8 Claims, 1 Drawing Sheet

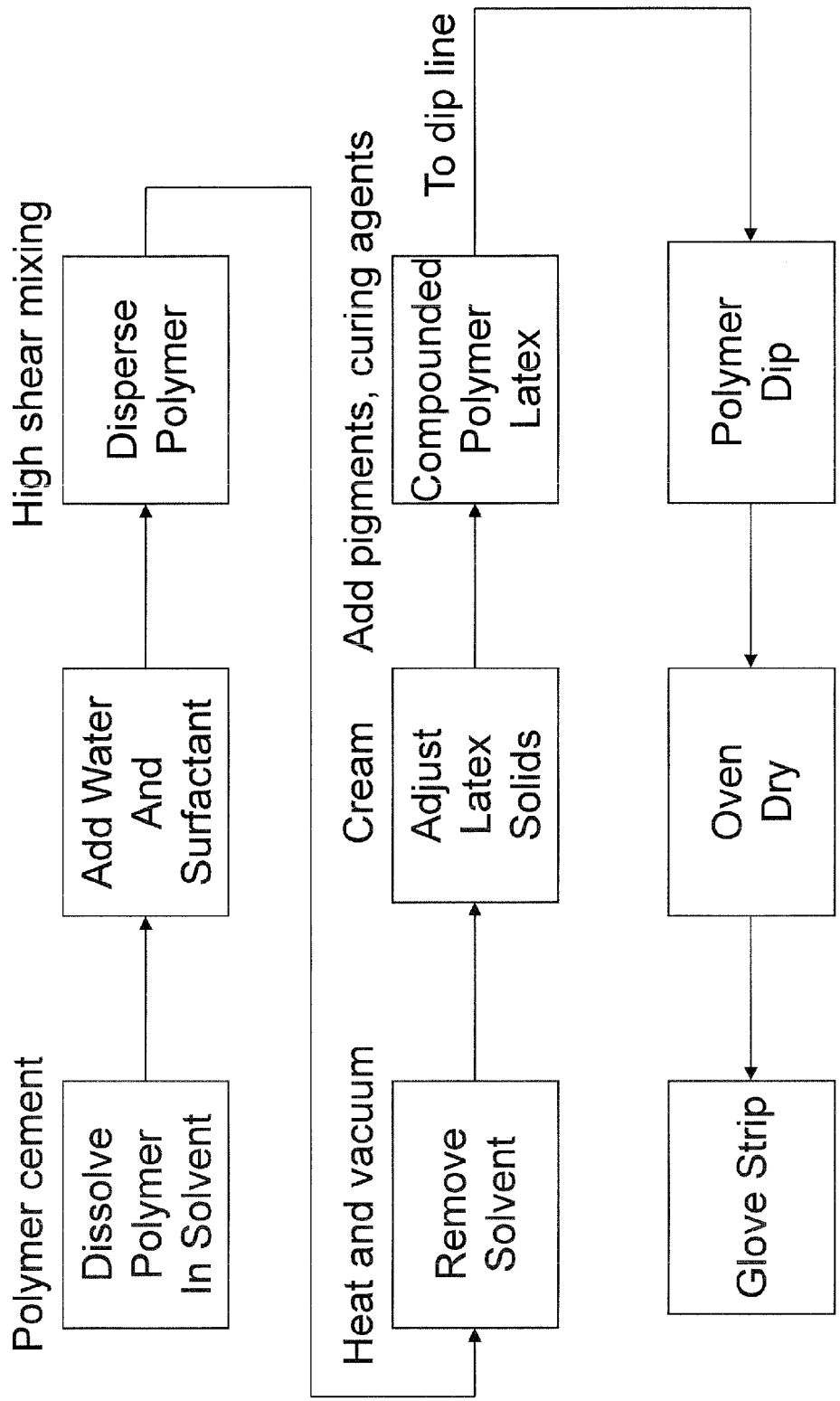

BUTYL RUBBER CONVERSION TO DISPERSION AND BUTYL RUBBER DIPPED GLOVE

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

Butyl rubber based coating agents for preparing a coated article, such as a glove, wherein a butyl rubber solution is in the form of a dispersion, and methods of using butyl rubber based coating agents.

BACKGROUND

Dip-coated (or dipped) articles, for example, gloves, are commonly used in a variety of industrial and personal applications. Butyl rubber is one commonly used material for making chemically resistant dipped gloves.

Various methods are currently used to make butyl rubber articles. For example, one commonly used method to make butyl rubber gloves involves using a solvent to make a butyl rubber cement. This cement is then used on a production dip line to produce butyl rubber gloves. The process commonly involves multiple dips with drying between each dip to remove the solvent. Multiple dips are needed to achieve the desired thickness of the glove. Thus, this process is typically time consuming and can take days. Furthermore, workers involved with this process need protective equipment to protect against the solvent, which further adds to the cost of the process.

Accordingly, there is a need in the art for an improved process to make dip-coated articles.

SUMMARY

The application provides methods for manufacturing a dip-coated article which involves the use of an aqueous butyl rubber dispersion and a coagulation method.

In one aspect, the application provides a method of preparing a coating agent comprising the steps of: a) dissolving dry butyl rubber in an organic solvent to produce a butyl rubber solution; b) adding water and at least one surfactant to said butyl rubber solution; c) mixing water, said at least one surfactant and said butyl rubber solution under high shear to obtain a desired particle size; d) removing said organic solvent under vacuum and temperature of between 120° F. and 900° F. to produce a butyl rubber dispersion; e) creaming said butyl rubber dispersion to obtain a desired solids content; f) adding at least one curing agent and/or at least one pigment to said butyl rubber dispersion; and g) mixing said at least one curing agent and/or at least one pigment with said butyl rubber dispersion.

Solvents suitable for the purposes of the provided methods include but are not limited to organic solvents, such as xylene, benzene, t-butyl benzene, toluene, chlorobenzene, hexane, tetrahydrofuran, heptanes, or mixtures thereof.

Surfactants suitable for the purposes of the provided methods include but are not limited to sodium dodecylbenzene sulfonate, other sulfonates and other surfactants.

Curing agents suitable for the purposes of the provided methods include but are not limited to, sulfur, sulfur donors and peroxides.

Pigments suitable for the purposes of the provided methods include but are not limited to calcium carbonate, carbon black, clays or other organic and inorganic pigment and dyes.

In one aspect, the application also provides a method of preparing a dip-coated article comprising coating a dip-formed article with the coating agent prepared according to the methods described in this application.

In one aspect, the dip-coated article is a glove.

In one aspect, the dip-formed article is prepared by dipping an article into a coagulant solution, wherein said coagulant solution comprises a coagulating agent and water, and then drying the article. Following the dipping into the coagulant solution, the coating agent is applied onto the dipped article.

Coagulating agents suitable for the purposes of the provided methods include but are not limited to calcium nitrate, calcium chloride, acetic acid and other coagulation agents.

Other features and advantages will become apparent from a review of the entire specification, including the appended claims.

BRIEF DESCRIPTION OF THE DRAWINGS

FIG. 1 describes an outline of a process for manufacturing a butyl rubber glove according to one provided method of the application.

DETAILED DESCRIPTION

The application provides methods for manufacturing dip-coated articles which involve the use of an aqueous butyl rubber dispersion and a coagulation method.

In an embodiment where the dip-coated article is a glove, the method allows the use of conventional latex dip lines.

In one aspect, the application provides a method of preparing a coating agent comprising the steps of: a) dissolving dry butyl rubber in an organic solvent to produce a butyl rubber solution; b) adding water and at least one surfactant to said butyl rubber solution; c) mixing water, said at least one surfactant and said butyl rubber solution under high shear to obtain a desired particle size; d) removing said organic solvent under vacuum and temperature of between 120° F. and 900° F. to produce a butyl rubber dispersion; e) creaming said butyl rubber dispersion to obtain a desired solids content; f) adding at least one curing agent and/or at least one pigment to said butyl rubber dispersion; and g) mixing said at least one curing agent and/or at least one pigment with said butyl rubber dispersion.

The dispersion does not need to be stabilized with any compounds, including but not limited to water-soluble high-molecular weight compounds, such as vinyl alcohol polymers, alkali-soluble polymers, cellulose derivatives and starch derivatives.

The specific amounts of the ingredients used in the provided methods are not critical and are easily determinable by a person of ordinary skill in the art.

In one embodiment, the amount of dry butyl rubber is between 5% and 55%.

In one embodiment, the amount of the organic solvent is between and 45% and 95%.

In one embodiment, the amount of the water is between 40% and 90%.

In one embodiment, the amount of the surfactant is between 0.25% and 10%.

Solvents suitable for the purposes of the provided methods include but are not limited to organic solvents, such as xylene, benzene, t-butyl benzene, toluene, chlorobenzene, hexane, tetrahydrofuran, heptane or mixtures thereof.

Surfactants suitable for the purposes of the provided methods include but are not limited to sodium dodecylbenzene sulfonate, other sulfonates and other surfactants.

For the purposes of the present application, the term "under high shear" means mixing the ingredients until a desired particle size is reached. There is no limitation on the particular method of mixing under high shear, as a variety of such methods are known to a person having an ordinary skill in the art.

Normally, the desired particle size obtained by high-shear mixing is between about 0.1 microns and 10 microns.

For the purposes of the present application, the term "creaming" means migration of the dispersed phase of an emulsion under the influence of buoyancy. Creaming is one of the methods for concentrating dispersions. This process can concentrate a low-solid dispersion to, for example, an above 50% solid dispersion. Creaming can be accelerated by the addition of certain creaming agents such as sodium alginate, polyvinyl alcohol or cellulose derivatives.

In one embodiment, the desired solids content obtained by creaming the dispersion is between about 5% and 60%; in another embodiment, the desired solids content is between about 10% and 55%.

Curing agents suitable for the purposes of the provided methods include but are not limited to sulfur/sulfur donors, accelerators (primary and secondary), and sulfur-curing (or vulcanization) activators and peroxide curing/cross-linking agents which are known to those skilled in the art. The chemical structure of the curing ingredients and their activity do not have to be kept intact throughout the emulsification process, but the incorporation of curing ingredient(s) should not adversely affect the desirable performance of the resulting article made by the dispersion of the present invention.

In one embodiment, the amount of the curing agent is between 0.1% and 5% based on weight of rubber in suspension.

Pigments suitable for the purposes of the provided methods include but are not limited to calcium carbonate, carbon black, clays or other organic and inorganic pigment and dyes.

In one embodiment, the amount of the pigment is between 1% and 40%.

Typically, the mixing of curing agent(s) and/or pigment(s) with said butyl rubber dispersion is carried out gently.

In one aspect, the application also provides a method of preparing a dip-coated article comprising coating a dip-formed article with the coating agent prepared according to the methods described in this application.

In one aspect, the dip-coated article is a glove.

In one aspect, the dip-formed article is prepared by dipping an article into a coagulant solution, wherein said coagulant solution comprises a coagulating agent and water, and then drying the article.

In one embodiment, a hand form is dipped into a coagulant solution containing calcium nitrate and water, then the hand form is dried, then the hand form is dipped into the aqueous butyl rubber dispersion, then it is dwelled until the desired thickness is obtained, then the hand form is removed, the gelled film is leached in water, and then is dried and cured.

FIG. 1 is a flowchart of one of the provided methods for preparing a dip-coated glove. First, dry butyl rubber is dissolved in an organic solvent to produce a butyl rubber solution; then, water and surfactant(s) are added; then, water, the surfactant(s) and the butyl rubber solution are mixed under high shear to obtain a desired particle size; then, the organic solvent is removed under vacuum and heat to produce a butyl rubber dispersion; then, the butyl rubber dispersion is creamed to obtain a desired solids content; then, curing agent(s) and/or pigment(s) are added to and mixed with the butyl rubber dispersion; then the dispersion is transferred to a conventional latex dip line; then, hand forms (pre-dipped into a coagulant solution) are dipped into the butyl rubber dispersion; then the hand forms are dried; and finally the glove is stripped from the hand form.

Coagulating agents suitable for the purposes of the provided methods include but are not limited to calcium nitrate, calcium chloride, acetic acid and other coagulation agents.

In one embodiment, the amount of the coagulating agent is between 5% and 50%.

Some of the benefits of the provided methods which would be readily recognized by those skilled in the art include lowering the cost of manufacturing of butyl rubber gloves or other items, reducing the time needed to produce the items, improving the product performance, and others.

For a clearer understanding of the invention, details are provided below. These are merely illustrations and are not to be understood as limiting the scope of the invention in any way. Indeed, various modifications of the invention in addition to those shown and described herein will become apparent to those skilled in the art from the following examples and foregoing description. Such modifications are also intended to fall within the scope of the appended claims.

EXAMPLE 1

This Example describes one possible method of preparing a butyl rubber glove in accordance with the methods disclosed in the application.

Coagulant Formulation:

Based on 100 parts in total: 30 parts is calcium nitrate, 0.01 part is Triton X-100, and the balance is water.

| Butyl Latex Formulation | % Solids | Dry PHR | Wet PHR |
|---|---|---|---|
| Butyl Latex | 31.5 | 100 | 317 |
| Zinc diethyldithiocarbamate | 50.0 | 1.0 | 2.0 |
| Sulfur | 68.0 | 1.5 | 2.2 |
| Tetramethylthiuram disulfide | 50.0 | 1.0 | 2.0 |

PHR: parts per hundred of rubber

Dipping Process:

A porcelain form is heated to 140° F. and then dipped into the coagulant solution which was heated to 110° F. The form dipping speed is 0.5 inches/second into and out of the coagulant solution. The form is rotated, first, fingers up, then fingers down for one minute at a speed of 33 degrees/second to provide a uniform layer of coagulant. The form with coagulant is placed into a 140° F. oven for 30 minutes to dry the coagulant. The form is then removed from the oven, allowed to cool to 120° F., then dipped into the butyl latex compound at a speed of 0.25 inches/second, then dwelled in the butyl latex compound for 30 seconds to build the required thickness, and then withdrawn at a speed of 0.25 inches/second. The form is then rotated, first, fingers up, then fingers down for 1.5 minutes at a speed of 33 degrees/second. The dipping form with the gelled butyl latex compound is placed into a 140° F. oven for 30 minutes. The dipping form is removed from the oven and placed into a 110° F. water bath for 20 minutes. The dipping form is removed from the water bath and placed into a 140° F. oven for 3 hours. The oven temperature is then increased to 190° F. for 1 hour. The dipping form is then placed into a 300° F. oven to cure for 25 minutes. The dipping form with cured butyl latex is then removed from the oven and cooled to approximately room temperature, dry talc is applied to the outer surface and the butyl latex glove is removed from the dipping form inside out.

The invention claimed is:

1. A method of preparing a coating agent consisting of the steps in the following sequential order: a) dissolving dry butyl rubber in an organic solvent to produce a butyl rubber solution; b) adding water and at least one surfactant to said butyl rubber solution; c) mixing water, said at least one surfactant and said butyl rubber solution to obtain a desired particle size; d) removing said organic solvent under vacuum and temperature of between 120° F. and 900° F. to produce a butyl rubber dispersion; e) creaming said butyl rubber dispersion to obtain a desired solids content, wherein said desired solids content is between 5% and 55% by weight, based on the total weight of said butyl rubber dispersion; f) adding at least one curing agent and/or at least one pigment to said butyl rubber dispersion, wherein said at least one curing agent is selected from the group consisting of sulfur, sulfur donors and peroxides and wherein said at least one pigment is selected from the group consisting of calcium carbonate, carbon black, clays or other organic and inorganic pigments and dyes; and g) mixing said at least one curing agent and/or at least one pigment with said butyl rubber dispersion.

2. The method according to claim 1, wherein said organic solvent is heptane.

3. The method according to claim 1, wherein said desired particle size is between 0.1 microns and 10 microns.

4. The method according to claim 1, wherein said temperature is about 140° F. to 350° F.

5. A method of preparing a coating agent consisting of the steps in the following sequential order: a) dissolving dry butyl rubber in an organic solvent to produce a butyl rubber solution; b) adding water and at least one surfactant to said butyl rubber solution; c) mixing water, said at least one surfactant and said butyl rubber solution to obtain a desired particle size; d) removing said organic solvent under vacuum and temperature of between 120° F. and 900° F. to produce a butyl rubber dispersion; e) creaming said butyl rubber dispersion to obtain a desired solids content; f) adding at least one curing agent and/or at least one pigment to said butyl rubber dispersion; g) mixing said at least one curing agent and/or at least one pigment with said butyl rubber dispersion; h) coating a dip-formed article with said coating agent, thereby preparing a coated article; and i) drying said dip-formed article after said dip-formed article is dipped into said coagulant solution.

6. The method according to claim 5, wherein said dip-formed article is a glove.

7. The method according to claim 5, wherein said dip-formed article is prepared by dipping an article form into a coagulant solution, wherein said coagulant solution comprises a coagulating agent.

8. The method according to claim 5, wherein said coagulating agent is calcium nitrate.

\* \* \* \* \*